(12) United States Patent
Andersen et al.

(10) Patent No.: US 8,128,362 B2
(45) Date of Patent: Mar. 6, 2012

(54) METHOD OF OPERATING A WIND TURBINE, A WIND TURBINE AND A CLUSTER OF WIND TURBINES

(75) Inventors: Brian W. Andersen, Ringkobing (DK); Erik Carl Miranda, Randers (DK)

(73) Assignee: Vestas Wind Systems A/S, Aarhus N (DK)

( * ) Notice: Subject to any disclaimer, the term of this patent is extended or adjusted under 35 U.S.C. 154(b) by 9 days.

(21) Appl. No.: 12/605,045

(22) Filed: Oct. 23, 2009

(65) Prior Publication Data

US 2010/0040468 A1 Feb. 18, 2010

Related U.S. Application Data

(63) Continuation of application No. PCT/DK2008/000167, filed on Apr. 30, 2008.

(30) Foreign Application Priority Data

Apr. 30, 2007 (DK) .................................. 2007 00652

(51) Int. Cl.
*F03D 7/04* (2006.01)
(52) U.S. Cl. .................................. 416/1; 416/37; 416/61
(58) Field of Classification Search ........................ 416/1
See application file for complete search history.

(56) References Cited

U.S. PATENT DOCUMENTS

| | | | | |
|---|---|---|---|---|
| 6,809,431 B1 * | 10/2004 | Schippmann | | 290/55 |
| 7,253,537 B2 * | 8/2007 | Weng et al. | | 290/44 |
| 7,352,075 B2 * | 4/2008 | Willey et al. | | 290/44 |
| 7,476,985 B2 * | 1/2009 | Llorente Gonzalez | | 290/44 |
| 2004/0197186 A1 | 10/2004 | Wobben | | |
| 2004/0230377 A1 | 11/2004 | Ghosh et al. | | |
| 2007/0057517 A1 | 3/2007 | McNerney | | |
| 2008/0001408 A1 | 1/2008 | Liu et al. | | |
| 2008/0195255 A1 * | 8/2008 | Lutze et al. | | 700/291 |

FOREIGN PATENT DOCUMENTS

| | | |
|---|---|---|
| DE | 19844258 A1 | 3/2000 |
| EP | 0266715 A2 | 5/1988 |
| EP | 0847496 B1 | 8/2000 |
| EP | 1988284 A1 | 11/2008 |
| WO | 0133075 A1 | 5/2001 |
| WO | 2006007838 A1 | 1/2006 |

OTHER PUBLICATIONS

International Preliminary Report on Patentability; PCT/DK2008/000167; Aug. 10, 2009; 10 pages.
International Search Report and Written Opinion of the International Searching Authority; PCT/DK2008/000167; Feb. 11, 2009; 16 pages.
Tapia A et al: "Modeling and dynamic regulation of a wind farm" Power Electronics Congress, 2000. CIEP 2000. VII IEEE International Oct. 15-19, 2000, Piscataway, NJ, USA,IEEE, Oct. 15, 2000, pp. 293-297, XP010527924 ISBN: 978-0-7803-6489-9.

* cited by examiner

*Primary Examiner* — Edward Look
*Assistant Examiner* — Ryan Ellis
(74) *Attorney, Agent, or Firm* — Wood, Herron & Evans, L.L.P.

(57) ABSTRACT

A method of operating a wind turbine above a predefined wind velocity comprising the step of operating a control parameter of the wind turbine within a tolerance band from a reference set-point curve of that control parameter. A wind turbine and a cluster of wind turbines is also contemplated.

20 Claims, 8 Drawing Sheets

METHOD OF OPERATING A WIND TURBINE, A WIND TURBINE AND A CLUSTER OF WIND TURBINES

CROSS-REFERENCE TO RELATED APPLICATIONS

The present application is a continuation of pending International patent application PCT/DK2008/000167 filed on Apr. 30, 2008 which designates the United States and claims priority from Danish patent application PA 2007 00652 filed on Apr. 30, 2007, the content of which is incorporated herein by reference.

FIELD OF THE INVENTION

The invention relates to a method of operating a wind turbine. The invention also relates to a wind turbine and a cluster of wind turbines.

BACKGROUND OF THE INVENTION

Hard weather conditions such as high wind speeds, have high impact on exposed wind turbines causing major loads on its components due to the excessive aerodynamical power of the wind acting on the wind turbine rotor.

Various methods of prior art have been to cut-off the wind turbine from the grid e.g. at a predefined stop wind speed or to reduce the power and/or the rotational speed of the rotor proportional to an increase in wind speed above a predefined "rolloff" wind speed.

EP 0847496 discloses a wind turbine control method implying that the power of the wind turbine as well as the rotor speed of a gear-less wind turbine is reduced continuously above and in dependence of a critical wind speed in order to avail the wind turbine to operate at an extended wind velocity range.

A problem related to this technique is that within the extended wind velocity range loads on wind turbine components such as the gear of a wind turbine comprising a gear box may be drastically increased. Furthermore for wind situations comprising high fluctuations in wind energy at the relevant high wind velocity may both appear very sudden and involve extreme sudden variations in e.g. the rotational speed of the wind turbine.

Fluctuations in wind energy may be less critical when applying the method in gear-less wind turbines while application in connection with a wind turbine including a gear is highly problematic as a continuous reduction of wind turbine rotor speed in relation to increasing wind velocity may require that the control is extremely fast as the possible fluctuations in energy increases critically while exceeding a certain point, e.g. 25 m/s.

It is an object of the present invention to provide an advantageous method of operating a wind turbine during high wind conditions without the above mentioned disadvantages.

SUMMARY OF THE INVENTION

The invention relates to a method of operating a wind turbine above a predefined wind velocity comprising the step of operating one or more control parameters of the wind turbine within a tolerance band from a reference set-point curve of said control parameters.

According to an advantageous embodiment of the invention, a soft control (strategy) may be applied in environments where a lenient regulation of the wind turbine and its components is necessary and where the components of the wind turbine experience constantly high loads or even increased loads in relation to an increase in wind velocity.

By allowing the control parameters to operate within a tolerance band from a set-point or set-point curve it is ensured that e.g. a sudden change/increase in the loads on wind turbine components such as the torque in the gear due to a reduction in generated power can be minimized as the excessive aerodynamical force in the wind is transferred to rotational speed. Following an increase in the rotational speed a wind turbine rotor speed controller can control the rotational speed to stay within said tolerance band for the rotational speed.

It is hereby ensured that the effect on loads on wind turbine components due to alternating parameters such as alternating wind velocities is minimized and held more constant.

In one aspect of the invention said control parameter is the rotational speed of the rotor. It is hereby ensured that vital parameters of the wind turbine are operated according to the control strategy, said parameters being vital for the applied loads on wind turbine components. It is hereby furthermore ensured that loads on the wind turbine components can be controlled at levels that are non-fatigue.

In another aspect of the invention, said control parameter is the pitch angle of one or more of the wind turbine rotor blades.

In another aspect of the invention, said one or more control parameters is the rotational speed of the rotor and the pitch angle of one or more of the wind turbine rotor blades.

In yet another aspect of the invention, said control parameter is the generated power.

The operation of said control parameter (CP) comprises operating any derivative hereof i.e. e.g. the rotational speed of the rotor can be derived by measuring and processing e.g. the rotational speed of the generator, rotational speed of the main shaft, electrical output of the generator etc.

In another aspect of the invention said operating a control parameter involves a reduction of the control parameter of the wind turbine. It is hereby ensured that loads on the wind turbine and wind turbine components are reduced accordingly.

In a further aspect of the invention, said operating a control parameter involves an increase of the pitch angle.

In another aspect of the invention said control parameter is lowered until a cut-off wind velocity value at which the wind turbine is shut down. Hereby it is ensured that parameters of the wind turbine stays within their operating range for wind velocities below said cut-off value and that the wind turbine is shut down if loads due to high wind velocities increases to a high level. It is furthermore ensured that the wind turbine is operated in a range suitable for the generator such as the slip-range above the nominal generator speed.

In yet another aspect of the invention said control parameter is lowered in one or more steps. Hereby a simple and easy implementable control strategy is obtained ensuring a high distance between operating values and allowable extreme values.

In another aspect of the invention said control parameter is lowered continuously. Hereby it is ensured that the wind turbine can be operated and stay connected to the utility grid and ensuring power production even at very high wind speeds.

In another aspect of the invention a width of said tolerance band is altered in relation to wind velocity, turbulence of the wind, pitch activity, loads on wind turbine components, the level of one or more control parameters or the like. Hereby it is ensured that the tolerance band can be adapted to an actual operating situation comprising the influence of various parameters of the environment and the wind turbine furthermore ensuring that the loads on wind turbine components can be held within the limits of the components. For various situations the tolerance band can be narrow resulting in a hard regulation and for other situations the tolerance band can be wide whereby the control parameter may vary relatively much as a result of a soft regulation.

In another aspect of the invention an offset of said tolerance band is altered in relation to the wind velocity, turbulence of the wind, pitch activity, the level of one or more control parameters or the like. Hereby it is ensured that the tolerance band can be adapted to an actual operating situation comprising the influence of various parameters of the environment and the wind turbine furthermore ensuring that the loads on wind turbine components can be held within the limits of the components. For various situations the tolerance band can be narrow resulting in a hard regulation and for other situations the tolerance band can be wide whereby the control parameter may vary relatively much as a result of a soft regulation. As an example of further embodiments the tolerance band is relative narrow for control parameters above a set-point curve i.e. the control parameter is controlled within the narrow tolerance band and fluctuations in the control parameter that occur are controlled by the wind turbine control system within the tolerance band with a hard regulation that allows relative small fluctuation of the control parameter. Contrary the tolerance band is relative wide for control parameters below a set-point curve i.e. the control parameter is controlled within the wide tolerance band and fluctuations in the control parameter that occur are controlled by the wind turbine control system within the tolerance band with a soft regulation that allows a relative wide fluctuation of the control parameter. For other embodiments the tolerance band is relative wide for control parameters above a set-point curve and relative narrow for control parameters below a set-point curve.

In another aspect of the invention a slope of said tolerance band is altered in relation to the wind velocity, turbulence of the wind, pitch activity, the level of one or more control parameters or the like. It is hereby ensured that the rate at which the control parameters are reduced in relation to e.g. a wind velocity increase, can be varied depending on various parameters. It is furthermore ensured that the slope may be non-linear in relation to the wind velocity such as exponential, logarithmic or of a higher order function or the slope may be non-continuous such as stepped. For one embodiment the width of the tolerance band is substantially wider at higher wind velocities than for lower wind velocities and for another embodiment of the invention the tolerance band is substantially wider for lower wind velocities than for higher wind velocities.

In another aspect of the invention, said set-point curve is variable and determined on the basis of operating conditions of the wind turbine such as wind velocity, turbulence of the wind, pitch activity, the level of one or more control parameters or the like.

In another aspect of the invention, said set-point curve is modified if the measured control parameter is reaching or is close to reaching the limits of said tolerance band. Hereby it is ensured that the wind turbine can be operated at a safe level for the components and that the control strategy is adapted to the actual operating situation.

In another aspect of the invention, high and low limits of said tolerance band are introduced at a predefined wind velocity lower than said predefined wind velocity value. Hereby the said wind turbine control parameter is allowed to vary within predefined limits in a controlled manner, even at relative high wind velocity values.

In another aspect of the invention, said predefined wind velocity is a value established on the basis of an average of actual wind velocity measurements. By operating the wind turbine on the basis of an average of actual wind velocity measurements it is ensured that a stable control of the wind turbine is established and that set points for wind turbine controllers are not constantly altered with a high frequency relating to the high frequent fluctuating wind velocities.

It is furthermore ensured that for e.g. winds at high wind situations with a high fluctuating or turbulence component, the loads on wind turbine components due to an aggressive control strategy is minimized.

In another aspect of the invention, said predefined wind velocity is defined dependency of forecasts of the wind. Hereby it is ensured that a suitable control mode and control parameters of the wind turbine can be established and adapted to coming weather situations which in turn ensures that loads on wind turbine may be minimized.

In another aspect of the invention said predefined wind velocity is dependent on the fluctuation in the wind. Hereby it is ensured that a more safe control mode or strategy can be established earlier for the wind turbine at sites or at wind situations with a high component of fluctuation in the wind as said fluctuations highly contribute to fatigue loads and decreased lifetime for wind turbine components.

The invention also relates to a wind turbine and a cluster of wind turbines.

BRIEF DESCRIPTION OF THE DRAWINGS

The invention will be described in the following with reference to the figures in which.

DETAILED DESCRIPTION OF THE INVENTION

Figure 1:
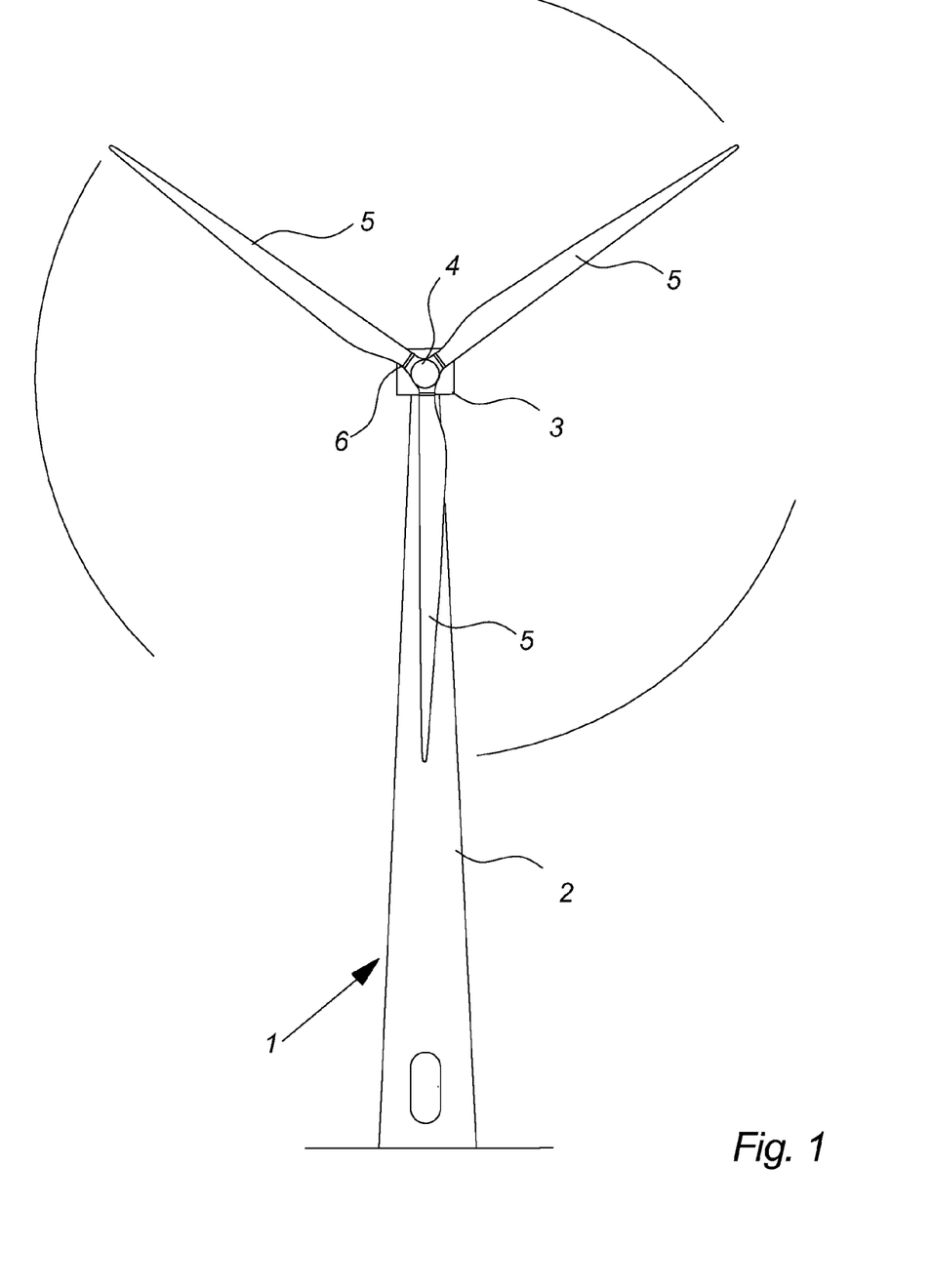
FIG. 1 illustrates a large modern wind turbine as seen from the front.

FIG. 1 illustrates a modern wind turbine 1 with a tower 2 and a wind turbine nacelle 3 positioned on top of the tower.

The wind turbine rotor, comprising at least one blade such as three wind turbine blades 5 as illustrated, is connected to the hub 4 through pitch mechanisms 6. Each pitch mechanism includes a blade bearing and individual pitch actuating means which allows the blade to pitch. The pitch process is controlled by a wind turbine controller comprising a pitch controller.

As indicated on the figure, wind over a certain level will activate the rotor and allow it to rotate in a substantially perpendicular direction to the wind. The rotation movement is converted to generated electric power which usually is supplied to the utility grid as will be known by skilled persons within the area.

The rotor of the wind turbine experiences fluctuations in environmental parameters such as wind velocity which in turn is generating fluctuations of wind turbind control parameters such as rotor speed and/or generated power. The fluctuations are relative to a desired set-point of the control parameter. As wind turbine components have specific operating ranges in which they operate optimally the said generated fluctuations preferably must be controlled within these operating ranges.

The present invention, present an advantageous method of operating a wind turbine during high wind conditions and especially situations comprising fluctuations wind velocity.

At high wind situations the components of a wind turbine are exposed to excessive loads where increasing wind velocity or sudden wind gusts may have high impact on said loads which may increase to levels near or above their fatigue limits. At such situations it is desired to control the wind turbine with control parameters that can minimize the risk of reaching e.g. the fatigue limits.

According to the invention control parameters of the wind turbine are operated within a tolerance band from a reference set-point curve of the specific control parameter i.e. the tolerance band defines the limits of variations that an actual control parameter can vary.

Figure 2:
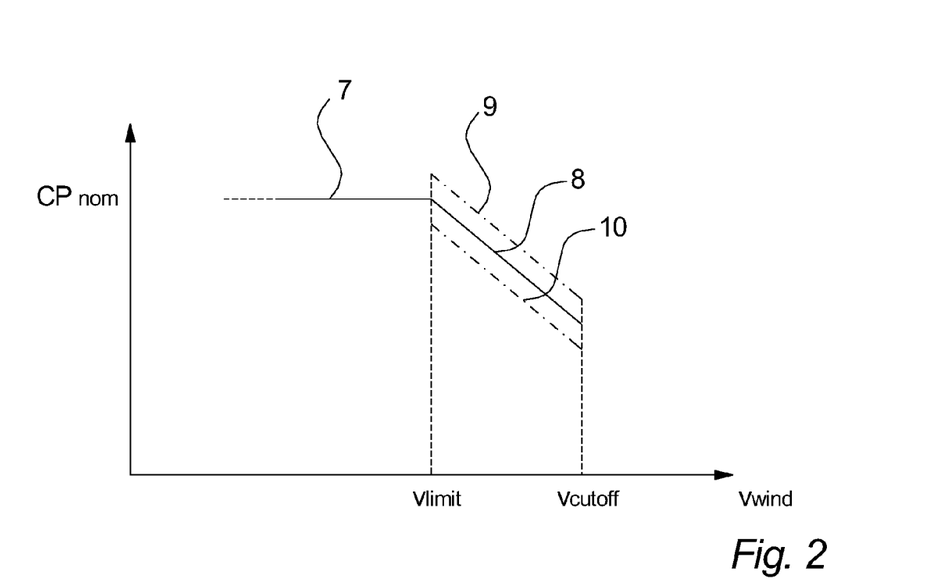
FIG. 2 illustrates schematically tolerance band applied to a continuous reduced set-point curve until a cutoff wind velocity value according to one embodiment of the invention.

FIG. 2 illustrates for one embodiment of the invention a tolerance band defined by a high limit curve 9 and a low limit curve 10 enveloping a set-point curve 8 of a specific control parameter. For this specific embodiment the set-point curve 8 is continuously reduced in relation to increasing wind velocities above a predefined wind velocity value $v_{limit}$ until said value reaches a cut-off value $v_{cutoff}$ at which the wind turbine is closed down.

The nominal control parameter set-point curve 7 illustrates the nominal level at which the actual control parameter is operated below said predefined wind velocity $v_{limit}$.

As the wind velocity increase and reach above the predefined wind velocity $v_{limit}$ the set-point of the control parameter 8 is reduced accordingly. Due to fluctuations in the wind, fluctuations in the control parameter occur and are controlled by the wind turbine control system within the tolerance band according to the invention as long as the variations stay within the limits 9, 10 of the tolerance band.

For various embodiments the regulation of the control parameter set-point is done independent of variations of control parameters within the tolerance band. For various embodiments the control parameter set-point may be regulated e.g. dependent on parameters of the wind velocity exclusively.

For various embodiments the control parameter is a parameter of the wind turbine such as the rotational speed of the rotor (n), the generated power (P) and/or the pitch angle.

Figure 3:
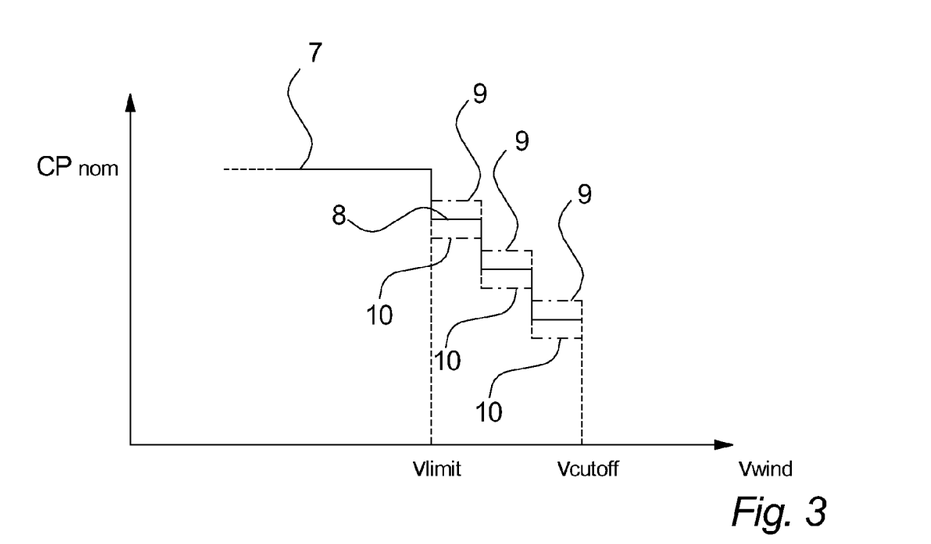
FIG. 3 illustrates schematically tolerance band applied to a stepwise reduced set-point curve until a cutoff wind velocity according to one embodiment of the invention.

FIG. 3 illustrates for another embodiment of the invention a tolerance band defined by a high limit curve 9 and a low limit curve 10 enveloping a set-point curve 8 of a specific control parameter. For this specific embodiment the set-point curve 8 is stepwise reduced in relation to increasing wind velocities above a predefined wind velocity value $v_{limit}$ until said value reaches a cut-off value $v_{cutoff}$ at which the wind turbine is closed down.

Figure 4A:
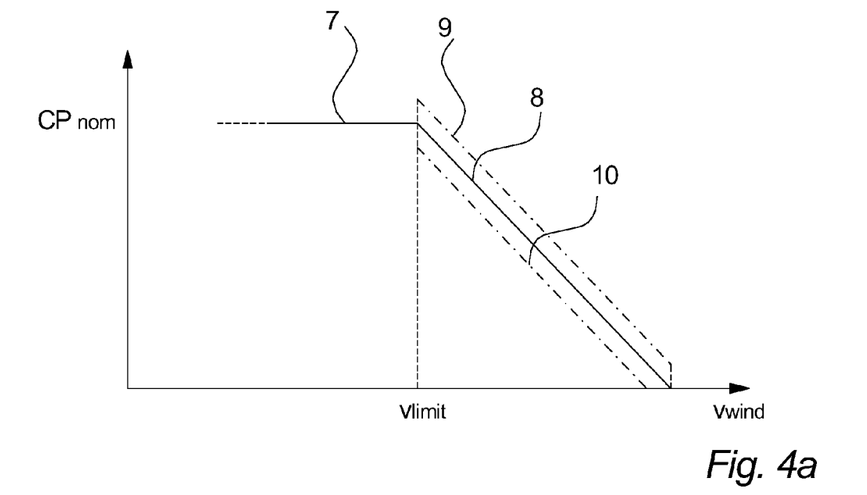
FIG. 4A illustrates schematically tolerance band applied to a continuous set-point curve parameter until substantially 0 according to one embodiment of the invention.

FIG. 4a illustrates for an embodiment of the invention a tolerance band defined by a high limit curve 9 and a low limit curve 10 enveloping a set-point curve 8 of a specific control parameter. For this specific embodiment the set-point curve 8 is continuously reduced in relation to increasing wind velocities above a predefined wind velocity value $v_{limit}$ until said set-point curve 8 reaches a value of substantially 0 at which the wind turbine is closed down.

The nominal control parameter set-point curve 7 illustrates the nominal level at which the actual control parameter is operated below said predefined wind velocity $v_{limit}$.

As the wind velocity increase and reach above the predefined wind velocity $v_{limit}$ the set-point of the control parameter 8 is reduced accordingly. Due to fluctuations in the wind, fluctuations in the control parameter occur and are controlled by the wind turbine control system within the tolerance band according to the invention as long as the variations stay within the limits 9, 10 of the tolerance band.

For various embodiments the regulation of the control parameter set-point is done independent of variations of control parameters within the tolerance band. For various embodiments the control parameter set-point may be regulated e.g. dependent on parameters of the wind velocity exclusively.

Figure 4B:
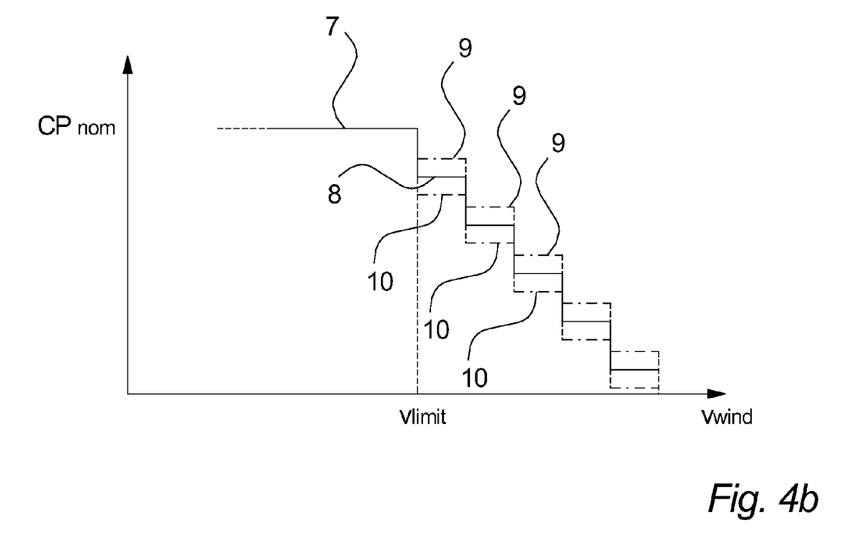
FIG. 4b illustrates schematically tolerance band applied to a stepwise reduced set-point curve until substantially 0 according to one embodiment of the invention.

FIG. 4b illustrates for another embodiment of the invention a tolerance band defined by a high limit curve 9 and a low limit curve 10 enveloping a set-point curve 8 of a specific control parameter. For this specific embodiment the set-point curve 8 is stepwise reduced in relation to increasing wind velocities above a predefined wind velocity value $v_{limit}$ until said set-point curve 8 reaches a value of substantially 0 at which the wind turbine is closed down.

For various embodiments of the invention comprising stepwise reduction of a specific control parameter, the wind velocity levels at which the control parameter is stepwise reduced as well as the amount of reduction, may vary for each individual step.

Figure 5A:
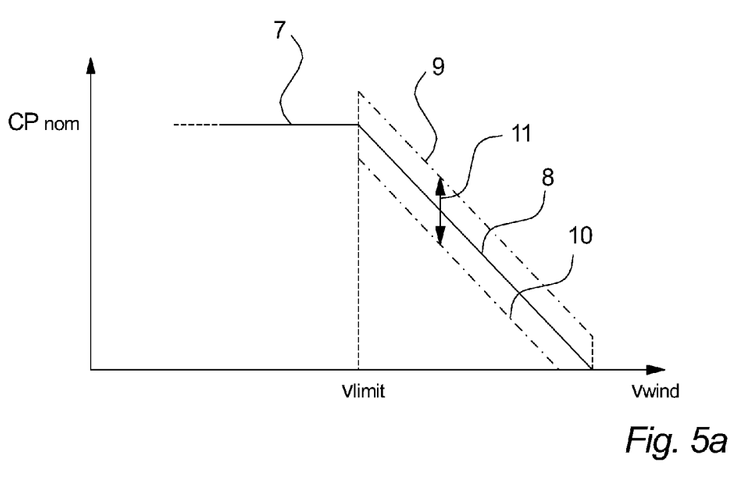
FIG. 5a illustrates schematically a relative narrow tolerance band applied to a set-point curve according to one embodiment of the invention.
Figure 5B:
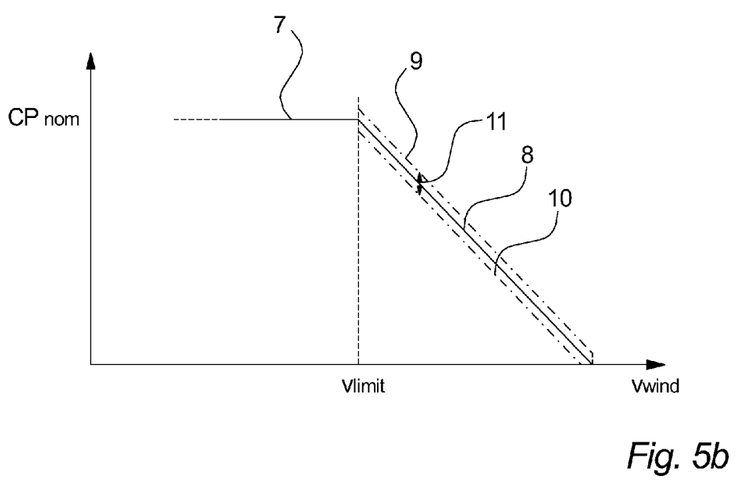
FIG. 5b illustrates schematically a relative wide tolerance band applied to a set-point curve according to one embodiment of the invention.

FIGS. 5a and 5b illustrates for further embodiments of the invention that the width 11 of said tolerance band can be altered such as in relation to wind velocity, turbulence of the wind, pitch activity, the level of one or more control parameters (CP) or the like.

FIG. 5a illustrates a tolerance band defined by a high limit curve 9 and a low limit curve 10 enveloping a set-point curve 8 of a specific control parameter. For this embodiment the width 11 of the tolerance band is relative high i.e. the control parameter is controlled within the wide tolerance band and fluctuations in the control parameter that occur are controlled by the wind turbine control system within the tolerance band with a soft regulation that allows relative high fluctuation of the control parameter.

FIG. 5b illustrates on the contrary a tolerance band of one embodiment of the invention defined by a high limit curve 9 and a low limit curve 10 enveloping a set-point curve 8 of a specific control parameter where the width 11 of the tolerance band is relative narrow i.e. the control parameter is controlled within the narrow tolerance band and fluctuations in the control parameter that occur are controlled by the wind turbine control system within the tolerance band with a hard regulation that allows relative small fluctuation of the control parameter.

For various embodiments of the invention the width of the tolerance band can be altered such as in relation to wind velocity, turbulence of the wind, pitch activity, loads on wind turbine components, the level of one or more control parameters (CP) or the like.

Figure 6A:
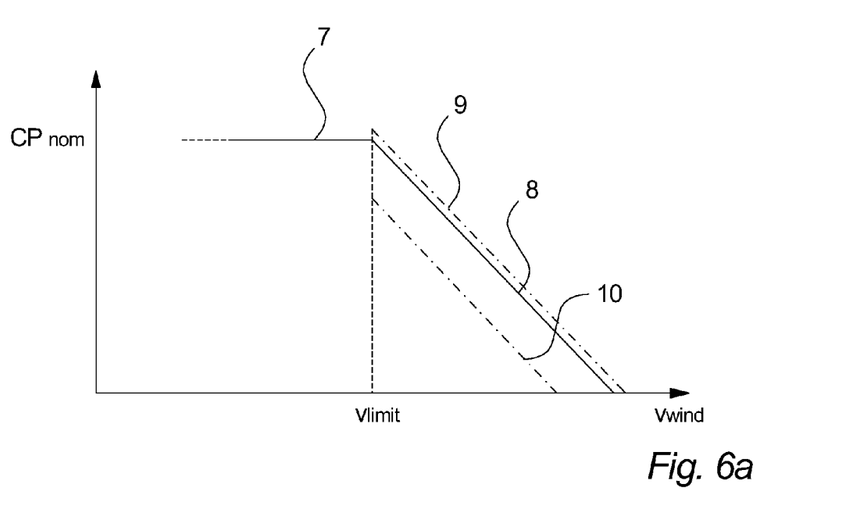
FIG. 6a illustrates schematically an offset of a tolerance band according to one embodiment of the invention.
Figure 6B:
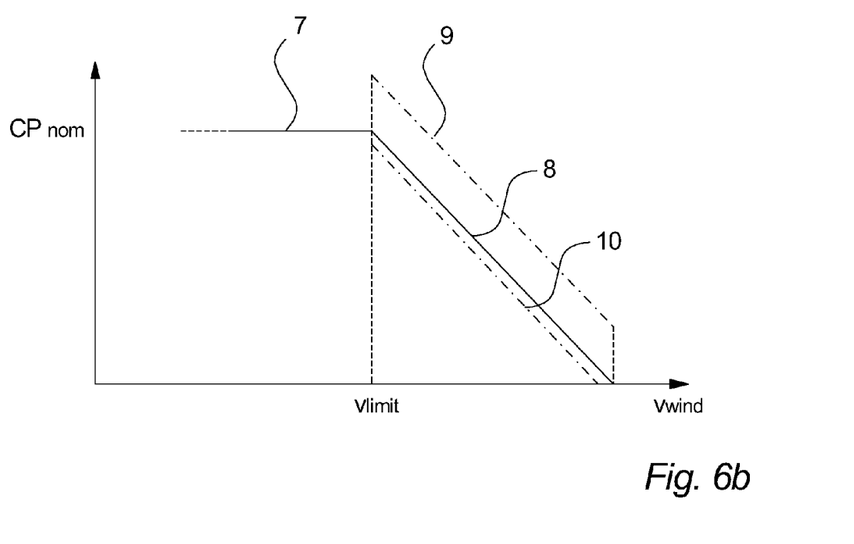
FIG. 6b illustrates schematically an offset of a tolerance band according to another embodiment of the invention.

FIGS. 6a and 6b illustrates for embodiments of the invention that the offset of the tolerance band can be altered such as in relation to wind velocity, turbulence of the wind, pitch activity, the level of one or more control parameters or the like.

FIG. 6a illustrates a tolerance band defined by a high limit curve 9 and a low limit curve 10 enveloping a set-point curve 8 of a specific control parameter. For this embodiment the offset of the tolerance band results that the tolerance band is relative narrow for control parameters above a set-point curve i.e. the control parameter is controlled within the narrow tolerance band and fluctuations in the control parameter that occur are controlled by the wind turbine control system within the tolerance band with a hard regulation that allows relative small fluctuation of the control parameter. Contrary the tolerance band is relative wide for control parameters below a set-point curve i.e. the control parameter is controlled within the wide tolerance band and fluctuations in the control parameter that occur are controlled by the wind turbine control system within the tolerance band with a soft regulation that allows a relative wide fluctuation of the control parameter.

FIG. 6b illustrates for another embodiment the opposite situation where the offset of the tolerance band results in a relative wide tolerance band for control parameters above a set-point curve and a relative narrow tolerance band for control parameters below a set-point curve.

Figure 7A:
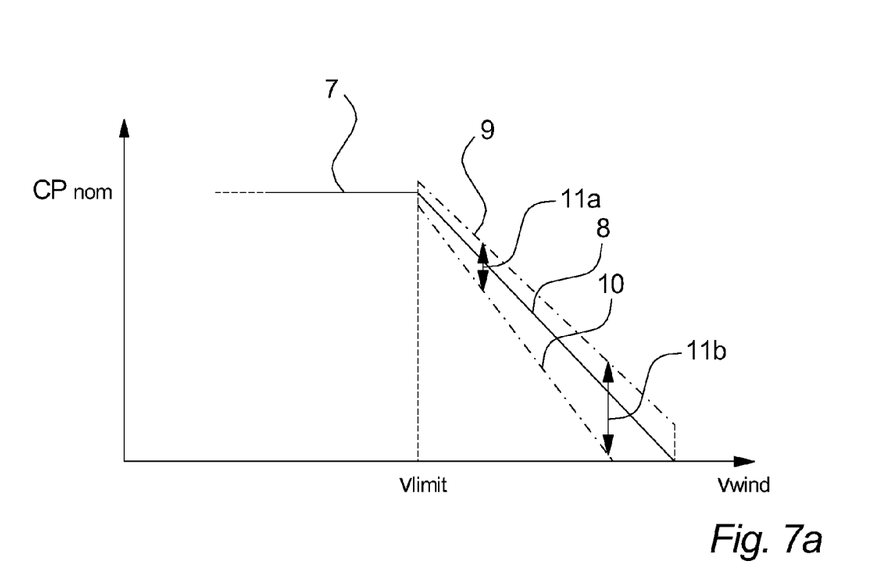
FIG. 7a illustrates schematically for one embodiment of the invention an altered slope of the tolerance band.

FIG. 7a illustrates schematically for yet another embodiment of the invention that the slope of the high and low limits of said tolerance band can be altered such as in relation to the wind velocity, turbulence of the wind, pitch activity, the level of one or more control parameters or the like.

As illustrated for this embodiment the width 11a, 11b of the tolerance band is altered as to be substantially wider at higher wind velocities than for lower wind velocities.

For another embodiment of the invention the tolerance band is altered as to be substantially wider for lower wind velocities than for higher wind velocities.

Figure 7B:
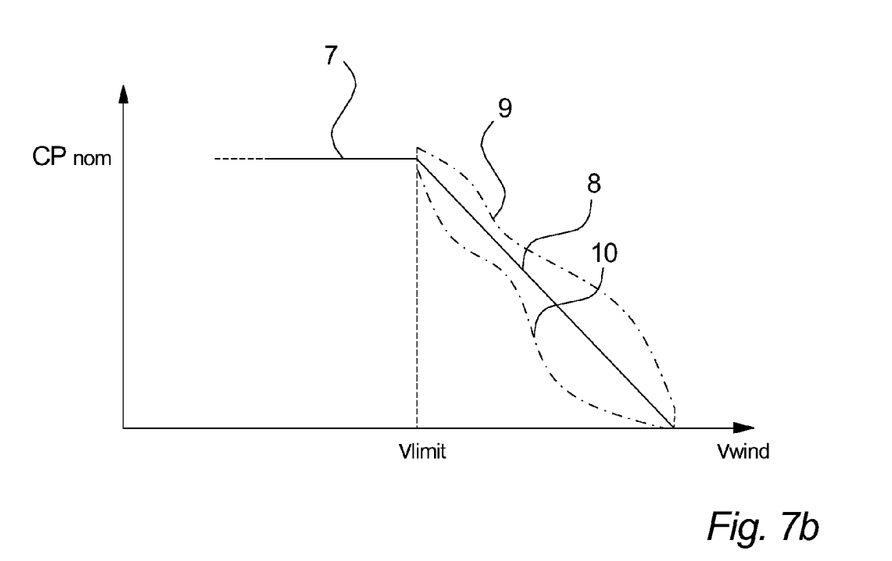
FIG. 7b illustrates schematically for one embodiment of the invention a non-linear tolerance band.

FIG. 7b illustrates schematically for another embodiment of the invention where the slope of the high and low limits of said tolerance band is non-linear in relation to the wind velocity. The limits of the tolerance band can be altered such as in relation to the wind velocity, turbulence of the wind, pitch activity, the level of one or more control parameters or the like and can for various embodiments have a curve form such as exponential, logarithmic or of a higher order function. For other embodiments the curve form of the slope may be non-continuous such as stepped.

Figure 7C:
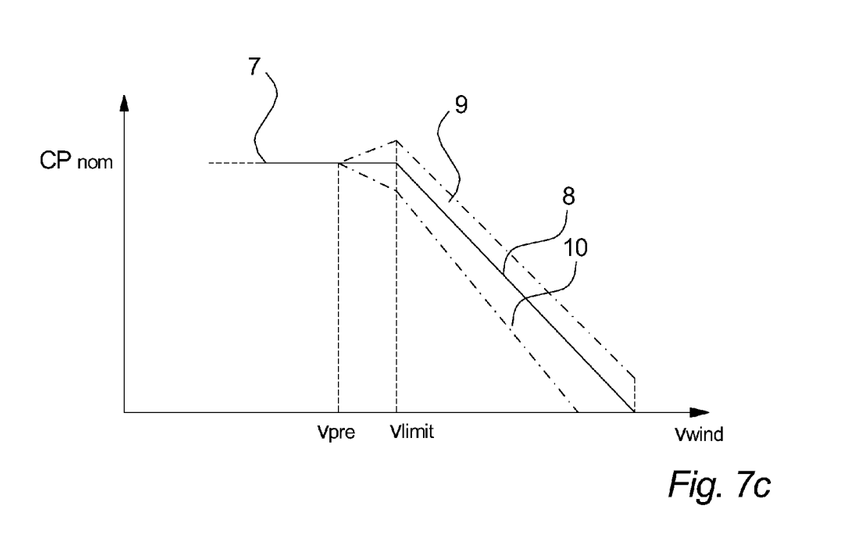
FIG. 7c illustrates schematically for one embodiment of the invention, the tolerance band introduced at a predefined wind velocity lower than the predefined wind velocity value.

FIG. 7c illustrates schematically for yet another embodiment of the invention where high and low limits of said tolerance band are introduced at a predefined wind velocity $v_{pre}$ lower than said predefined wind velocity value $v_{limit}$.

Figure 8:
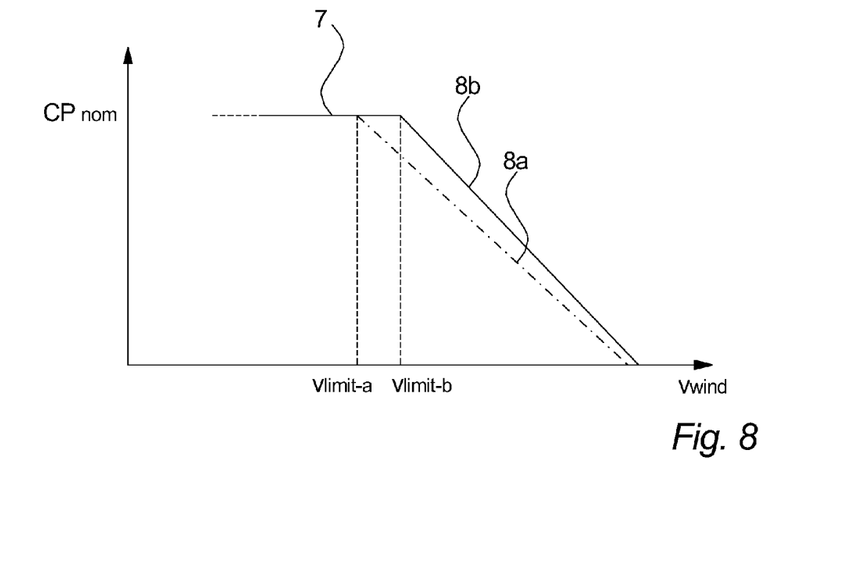
FIG. 8 illustrates schematically for various embodiments of the invention different values of pre-defined wind velocities.

FIG. 8 illustrates for various embodiments of the invention the predefined wind velocity value $v_{limit}$ above which said tolerance band is controlled.

The predefined wind velocity value can for one embodiment be fixed such as 23 m/s or 25 m/s or can for another embodiment be altered dependent of e.g. parameters of the wind such as turbulence of the wind.

The figure illustrates that for one wind situation e.g. comprising a high level of turbulence, the predefined wind velocity $v_{limit-a}$ can be relatively low in order to minimize loads on the wind turbine and wind turbine components.

For a second wind situation e.g. comprising a low level of turbulence, the predefined wind velocity $v_{limit-b}$ can be relatively high.

For one embodiment of the invention the predefined wind velocity value $v_{limit}$ is a value established on the basis of an average of actual wind velocity measurements.

For a further embodiment the predefined wind velocity value $v_{limit}$ is a value established dependent on forecasts of the wind.

For yet an embodiment the predefined wind velocity value is established dependent on the fluctuation in the wind.

Figure 9:
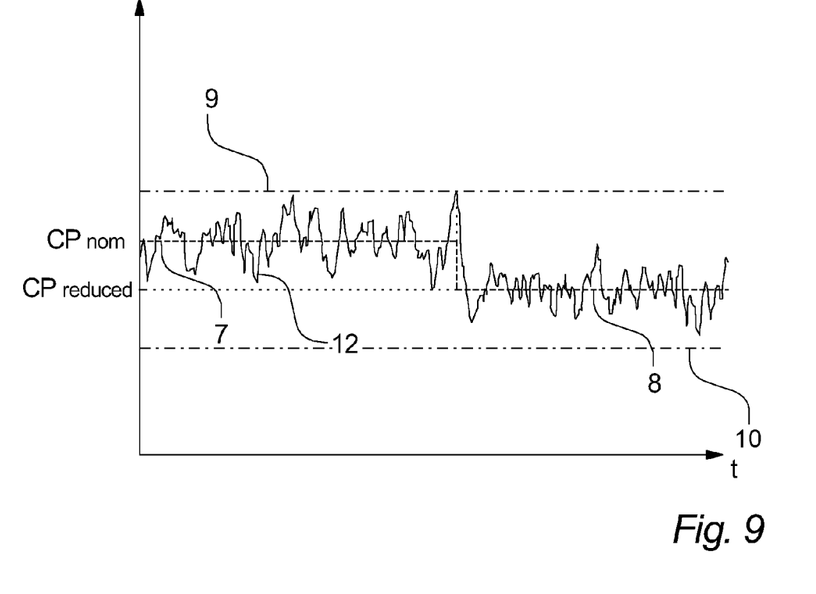
FIG. 9 illustrates schematically a control scheme for one embodiment of the invention.

FIG. 9 illustrates for even further embodiments of the invention a control scheme for situations where the wind velocity $v_{wind}$ rises to above a predefined wind velocity value $v_{limit}$.

For wind velocities below the predefined wind velocity value $v_{limit}$ the nominal control parameter set-point 7 is operating at nominal level $CP_{nom}$ and the control parameter 12 is controlled within the limits of the tolerance band 9, 10.

For a specific wind situation where the control parameter 12 is reaching e.g. the high limit of the tolerance band 9 e.g. as a result of a wind gust, the nominal control parameter set-point 7 is reduced 8 as to ensure that the control parameter 12 stays within the tolerance band.

What is claimed is:

1. A method of operating a wind turbine having a wind turbine controller, the method comprising the steps of:
 establishing a predefined wind velocity value;
 establishing one or more control parameters of the wind turbine;
 establishing a reference set-point curve for each of the parameters;
 defining a tolerance band, defined by a high limit curve and a low limit curve different than the high limit curve, that envelops the reference set-point curve of the one or more control parameters;
 operating the wind turbine using the wind turbine controller such that the one or more control parameters may fluctuate within the tolerance band; and
 altering an offset of the tolerance band in relation to wind velocity, turbulence of the wind, pitch activity, or a level of the one or more control parameters.

2. The method of operating a wind turbine according to claim 1, wherein the one or more control parameters is a rotational speed of a rotor.

3. The method of operating a wind turbine according to claim 1, wherein the one or more control parameters is a pitch angle of one or more wind turbine rotor blades.

4. The method of operating a wind turbine according to claim 3, wherein the one or more control parameters is lowered continuously.

5. The method of operating a wind turbine according to claim 1, wherein the one or more control parameters is a rotational speed of a rotor and a pitch angle of one or more wind turbine rotor blades.

6. The method of operating a wind turbine according to claim 1, wherein the one or more control parameters is generated power.

7. The method of operating a wind turbine according to claim 1, wherein said operating the wind turbine involves a reduction of the control parameter of the wind turbine.

8. The method of operating a wind turbine according to claim 1, wherein the one or more control parameters is a pitch angle of one or more wind turbine blades, and said operating the wind turbine involves an increase in the pitch angle.

9. The method of operating a wind turbine according to claim 1, wherein the one or more control parameters is lowered until a cut-off wind velocity value at which the wind turbine is shut down.

10. The method of operating a wind turbine according to claim 1, wherein the one or more control parameters is lowered in one or more steps.

11. The method of operating a wind turbine according to claim 1, wherein a width of said tolerance band is altered in relation to wind velocity, turbulence of the wind, pitch activity, loads on wind turbine components, or a level of the one or more control parameters.

12. The method of operating a wind turbine according to claim 1, wherein a slope of said tolerance band is altered in relation to wind velocity, turbulence of the wind, pitch activity, or a level of the one or more control parameters.

13. The method of operating a wind turbine according to claim 1, wherein said set-point curve is variable and determined on the basis of operating conditions of the wind turbine such as wind velocity, turbulence of the wind, pitch activity, or a level of the one or more control parameters.

14. The method of operating a wind turbine according to claim 1, wherein said set-point curve is modified if a measured control parameter is reaching or is close to reaching the limits of said tolerance band.

15. The method of operating a wind turbine according to claim 1, wherein the high and low limits of said tolerance band are introduced at a predefined wind velocity lower than said predefined wind velocity value.

16. The method of operating a wind turbine according to claim 1, wherein said predefined wind velocity is a value established on the basis of an average of actual wind velocity measurements.

17. A wind turbine for performing the method as claimed in claim 1.

18. The wind turbine according to claim 17, wherein said wind turbine is a double fed induction generator (DFIG) wind turbine.

19. A cluster of wind turbines comprising two or more wind turbines as claimed in claim 17.

20. A method of operating a wind turbine having a wind turbine controller, the method comprising the steps of:
   establishing a predefined wind velocity value;
   establishing one or more control parameters of the wind turbine;
   establishing a reference set-point curve for each of the parameters;
   defining a tolerance band, defined by a high limit curve and a low limit curve different than the high limit curve, that envelops the reference set-point curve of the one or more control parameters;
   operating the wind turbine using the wind turbine controller such that the one or more control parameters may fluctuate within the tolerance band; and
   altering a slope of the tolerance band in relation to wind velocity, turbulence of the wind, pitch activity, or a level of the one or more control parameters.

* * * * *